United States Patent [19]
Wecker

[11] Patent Number: 6,118,391
[45] Date of Patent: Sep. 12, 2000

[54] COMPRESSION INTO ARBITRARY CHARACTER SETS

[75] Inventor: David B. Wecker, Bothell, Wash.

[73] Assignee: Microsoft Corporation, Redmond, Wash.

[21] Appl. No.: 09/059,450

[22] Filed: Apr. 13, 1998

Related U.S. Application Data

[60] Provisional application No. 60/070,720, Jan. 7, 1998.

[51] Int. Cl.[7] .................................................. H03M 5/00
[52] U.S. Cl. ............................................. 341/55; 341/51
[58] Field of Search ........................................ 341/51, 55

[56] References Cited

U.S. PATENT DOCUMENTS

| | | |
|---|---|---|
| 4,464,650 | 8/1984 | Eastman et al. ...................... 340/347 |
| 5,446,678 | 8/1995 | Saltzstein et al. ...................... 364/514 |
| 5,793,869 | 8/1998 | Clafflin, Jr. .............................. 380/49 |
| 5,799,016 | 8/1998 | Onweller ................................. 370/401 |
| 5,841,477 | 11/1998 | Kim ........................................ 348/420 |

Primary Examiner—Brian Young
Assistant Examiner—Jason L. W. Kost
Attorney, Agent, or Firm—Westman, Champlin & Kelly, PA

[57] ABSTRACT

A computer-readable medium includes computer-executable instruction for compressing data to form a compressed data stream for a restricted channel. Specifically, data is compressed to form code values and character values, and a mask is created that indicates the location of these code values and character values in the compressed data stream. Each mask constructed by the method is selected from a set of valid values that can pass through the restricted channel.

16 Claims, 7 Drawing Sheets

| CHAR | ASCII | CHAR | ASCII | CHAR | ASCII | CHAR | ASCII |
|---|---|---|---|---|---|---|---|
| SP | 20 | 8 | 38 | P | 50 | h | 68 |
| ! | 21 | 9 | 39 | Q | 51 | i | 69 |
| " | 22 | : | 3A | R | 52 | j | 6A |
| # | 23 | ; | 3B | S | 53 | k | 6B |
| $ | 24 | < | 3C | T | 54 | l | 6C |
| % | 25 | = | 3D | U | 55 | m | 6D |
| & | 26 | > | 3E | V | 56 | n | 6E |
| ' | 27 | ? | 3F | W | 57 | o | 6F |
| ( | 28 | @ | 40 | X | 58 | p | 70 |
| ) | 29 | A | 41 | Y | 59 | q | 71 |
| * | 2A | B | 42 | Z | 5A | r | 72 |
| + | 2B | C | 43 | [ | 5B | s | 73 |
| , | 2C | D | 44 | \ | 5C | t | 74 |
| - | 2D | E | 45 | ] | 5D | u | 75 |
| . | 2E | F | 46 | ^ | 5E | v | 76 |
| / | 2F | G | 47 | _ | 5F | w | 77 |
| 0 | 30 | H | 48 | ` | 60 | x | 78 |
| 1 | 31 | I | 49 | a | 61 | y | 79 |
| 2 | 32 | J | 4A | b | 62 | z | 7A |
| 3 | 33 | K | 4B | c | 63 | { | 7B |
| 4 | 34 | L | 4C | d | 64 | \| | 7C |
| 5 | 35 | M | 4D | e | 65 | } | 7D |
| 6 | 36 | N | 4E | f | 66 | ~ | 7E |
| 7 | 37 | O | 4F | g | 67 |  |  |

| DATA | CONVERTED DATA |
|------|---------------|
| 00 | 7D 20 |
| 01 | 7D 21 |
| 02 | 7D 22 |
| ⋮ | ⋮ |
| 1D | 7D 3D |
| 1E | 7D 3E |
| 1F | 7D 3F |
| 20 | 20 |
| 21 | 21 |
| 22 | 22 |
| ⋮ | ⋮ |
| 7B | 7B |
| 7C | 7C |
| 7D | 7D 60 |
| 7E | 7D 61 |
| 7F | 7D 62 |
| 80 | 7D 40 |
| 81 | 7D 41 |
| ⋮ | ⋮ |
| 9E | 7D 5E |
| 9F | 7D 5F |
| A0 | 7E 20 |
| A1 | 7E 21 |
| ⋮ | ⋮ |
| FD | 7E 7D |
| FE | 7E 7E |
| FF | 7D 63 |

COMPRESSION INTO ARBITRARY CHARACTER SETS

REFERENCE TO CO-PENDING APPLICATION

The present application claims priority from U.S. provisional application Ser. No. 60/070,720 filed on Jan. 7, 1998, entitled "FEATURES OF TRANSMISSION AND MANIPULATION OF DATA".

BACKGROUND OF THE INVENTION

The present invention relates to encoding. In particular, the present invention relates to encoding for restricted channels.

In digital communications, data is transferred from a source to a destination through a channel. All channels are limited by their bandwidth, which represents the amount of data the channels can carry. Some channels are also restricted by the types of data they can carry. For example, many electronic mail channels and many pager channels do not allow data to pass unless it is in the form of a printable character. This limitation requires that each byte of data have a value between "20" hexadecimal (hex) and "7E" hex.

To send larger amounts of data across bandwidth-limited channels, the art has developed several compression algorithms. Typically, these compression algorithms replace sections of data in the data stream with compression codes. The compression codes identify earlier-transmitted sections of data that are identical to the replaced sections of data. Since the compression codes are smaller than the sections of data they replace, the total amount of data passed through the channel is reduced.

In order to decompress the data at the destination, the decompression algorithm must be able to distinguish the compression codes from the data. To assist the decompression algorithms, many compression algorithms embed a "mask" into the data that identifies the location of the compression codes in the compressed data stream.

In the prior art, the output produced by the compression algorithm was strictly binary and did not take into consideration channel restrictions that require the data to be within a certain range. To overcome this limitation, the art has used channel encoders, such as UUENCODE and MIME, which convert the binary values produced by the compression algorithm into an acceptable range of values. For example, in UUENCODE, every three bytes of data from the compression algorithm are divided into four 6-bit segments. Two zeros are then added above the highest bit locations in the four 6-bit segments. This forms four 8-bit segments. A hexadecimal value of "20" is then added to each of the four 8-bit segments, forming four 8-bit segments with values of no less than "20" hexadecimal and no more than "5F" hexadecimal.

Although the prior art provided compressed and encoded data that could travel through a restricted channel, the prior art is extremely inefficient. In particular, UUENCODE expands every three bytes of compressed data into four bytes of compressed data. In addition, such encoding does not take advantage of the fact that many bytes produced by compression algorithms do not need further encoding because they already meet the restrictions of the channel.

SUMMARY OF THE INVENTION

A computer-readable medium includes computer-executable instruction for compressing data to form a compressed data stream for a restricted channel. Specifically, data is compressed to form code values and character values, and a mask is created that indicates the location of these code values and character values in the compressed data stream. Each mask constructed by the method is selected from a set of valid values that can pass through the restricted channel.

In preferred embodiments, the method of the present invention inserts character values directly into the compressed data stream if the character values are from the set of valid values. If the character values are not from the set of valid values, the character values are converted into a first value and a second value, where the first value indicates that the first and second values represent a character value.

DETAILED DESCRIPTION OF THE PREFERRED EMBODIMENTS

Figure 1:
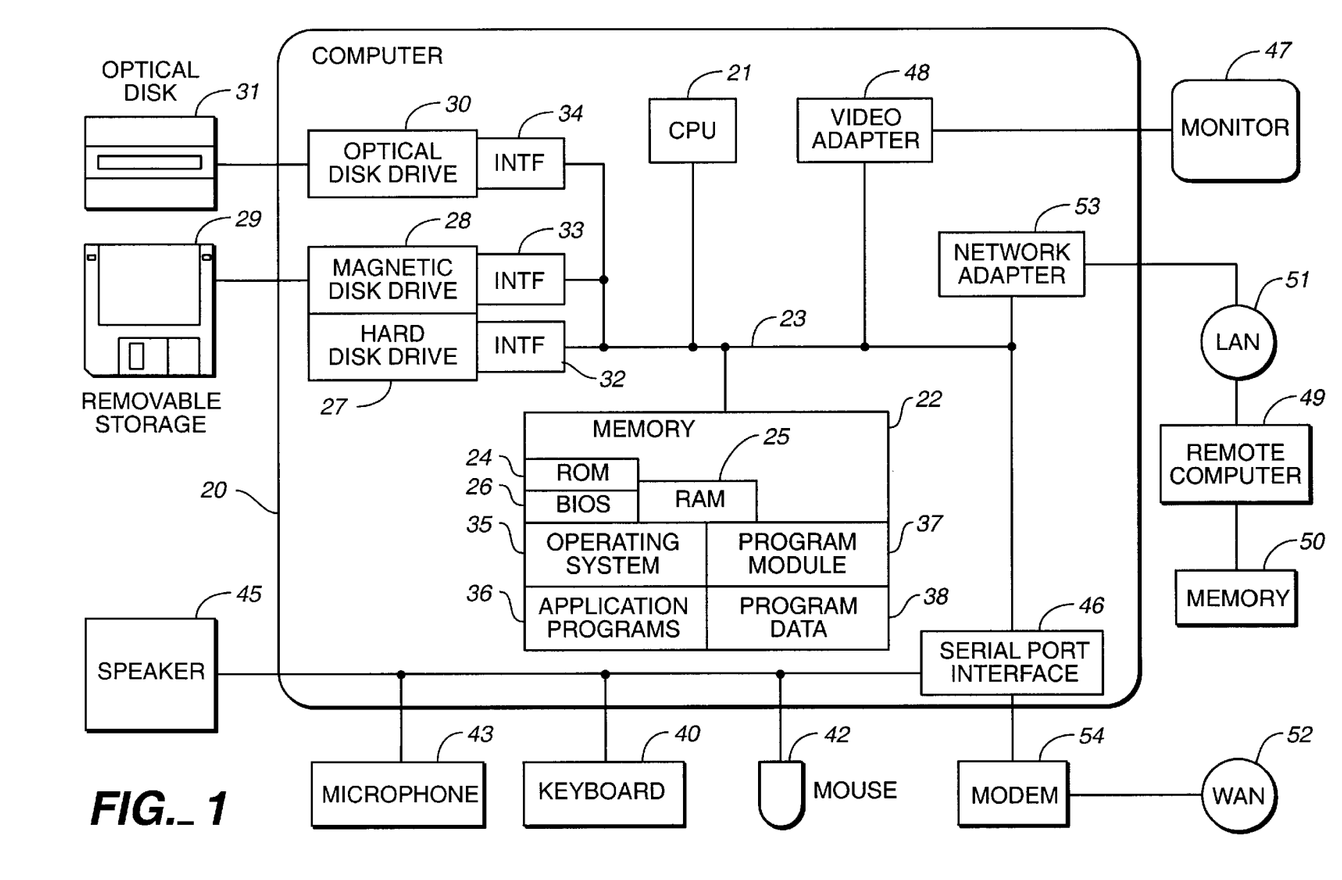
FIG. 1 is a plan view of an operating environment for the present invention.

FIG. 1 and the related discussion are intended to provide a brief, general description of a suitable computing environment in which the invention may be implemented. Although not required, the invention will be described, at least in part, in the general context of computer-executable instructions, such as program modules, being executed by a personal computer. Generally, program modules include routine programs, objects, components, data structures, etc. that perform particular tasks or implement particular abstract data types. Moreover, those skilled in the art will appreciate that the invention may be practiced with other computer system configurations, including hand-held devices, multi-processor systems, microprocessor-based or programmable consumer electronics, network PCs, minicomputers, mainframe computers, and the like. The invention may also be practiced in distributed computing environments where tasks are performed by remote processing devices that are linked through a communications network. In a distributed computing environment, program modules may be located in both local and remote memory storage devices.

With reference to FIG. 1, an exemplary system for implementing the invention includes a general purpose computing device in the form of a conventional personal computer 20, including a processing unit (CPU) 21, a system memory 22, and a system bus 23 that couples various system components including the system memory 22 to the processing unit 21. The system bus 23 may be any of several types of bus structures including a memory bus or memory controller, a peripheral bus, and a local bus using any of a variety of bus architectures. The system memory 22 includes read only memory (ROM) 24 and random access memory (RAM) 25. A basic input/output (BIOS) 26, containing the basic routine that helps to transfer information between elements within the personal computer 20, such as during start-up, is stored in ROM 24. The personal computer 20 further includes a hard disk drive 27 for reading from and writing to a hard disk (not shown), a magnetic disk drive 28 for reading from or writing to removable magnetic disk 29, and an optical disk drive 30 for reading from or writing to a removable optical disk 31 such as a CD ROM or other optical media. The hard disk drive 27, magnetic disk drive 28, and optical disk drive 30 are connected to the system bus 23 by a hard disk drive interface 32, magnetic disk drive interface 33, and an optical drive interface 34, respectively. The drives and the associated computer-readable media provide nonvolatile storage of computer readable instructions, data structures, program modules and other data for the personal computer 20.

Although the exemplary environment described herein employs the hard disk, the removable magnetic disk 29 and the removable optical disk 31, it should be appreciated by those skilled in the art that other types of computer readable media which can store data that is accessible by a computer, such as magnetic cassettes, flash memory cards, digital video disks, Bernoulli cartridges, random access memories (RAMs), read only memory (ROM), and the like, may also be used in the exemplary operating environment.

A number of program modules may be stored on the hard disk, magnetic disk 29, optical disk 31, ROM 24 or RAM 25, including an operating system 35, one or more application programs 36, other program modules 37, and program data 38. A user may enter commands and information into the personal computer 20 through input devices such as a keyboard 40, pointing device 42 and a microphone 43. Other input devices (not shown) may include a joystick, game pad, satellite dish, scanner, or the like. These and other input devices are often connected to the processing unit 21 through a serial port interface 46 that is coupled to the system bus 23, but may be connected by other interfaces, such as a sound card, a parallel port, a game port or a universal serial bus (USB). A monitor 47 or other type of display device is also connected to the system bus 23 via an interface, such as a video adapter 48. In addition to the monitor 47, personal computers may typically include other peripheral output devices, such as a speaker 45 and printers (not shown).

The personal computer 20 may operate in a networked environment using logic connections to one or more remote computers, such as a remote computer 49. The remote computer 49 may be another personal computer, a hand-held device, a server, a router, a network PC, a peer device or other network node, and typically includes many or all of the elements described above relative to the personal computer 20, although only a memory storage device 50 has been illustrated in FIG. 1. The logic connections depicted in FIG. 1 include a local area network (LAN) 51 and a wide area network (WAN) 52. Such networking environments are commonplace in offices, enterprise-wide computer network intranets, and the Internet.

When used in a LAN networking environment, the personal computer 20 is connected to the local area network 51 through a network interface or adapter 53. When used in a WAN networking environment, the personal computer 20 typically includes a modem 54 or other means for establishing communications over the wide area network 52, such as the Internet. The modem 54, which may be internal or external, is connected to the system bus 23 via the serial port interface 46. In a network environment, program modules depicted relative to the personal computer 20, or portions thereof, may be stored in the remote memory storage devices. It will be appreciated that the network connections shown are exemplary and other means of establishing a communications link between the computers may be used. For example, a wireless communication link may be established between one or more portions of the network.

Figure 2:
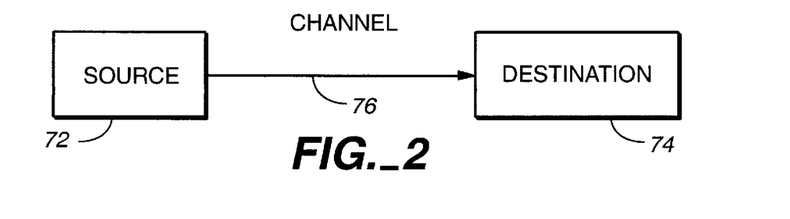
FIG. 2 is a block diagram of a communication system.

FIG. 2 is a block diagram of a communication system 70 having a source 72 connected to a destination 74 by a channel 76. Channel 76 can include hardwired connections between source 72 and destination 74, as well as wireless connections across the atmosphere or space. Signals sent across channel 76 can travel by electrical conduction or and electromagnetic waves.

Channel 76 is bandwidth limited, such that there is a maximum amount of data the channel can carry at any one time. In addition, channel 76 may be restricted such that it can only carry bits that can be grouped together into values within certain ranges. For example, channel 76 may be limited to printable ASCII characters, which have hexadecimal values between "20" and "7E". Such channels are common to electronic mail systems and pager systems.

Figure 3:
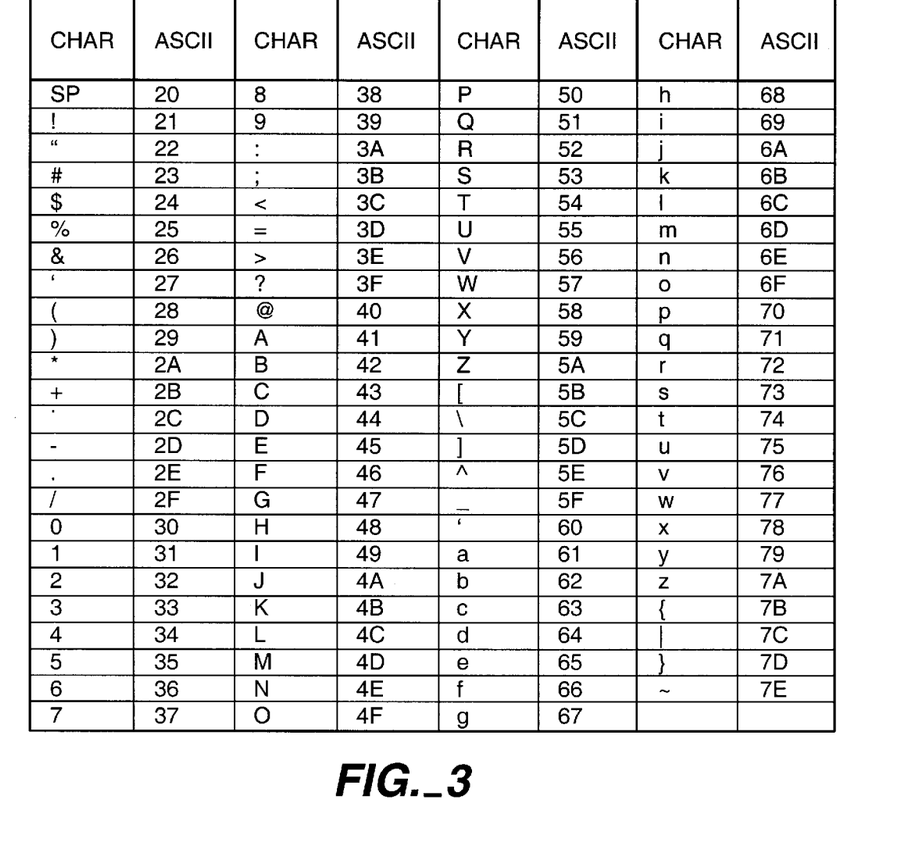
FIG. 3 is a table of printable characters and their hexadecimal representations.

To aid in understanding the invention, FIG. 3 includes a table of printable characters and their respective ASCII (hexadecimal) values. In FIG. 3, "SP" represents a space. This table is well known in the art.

Figure 4:
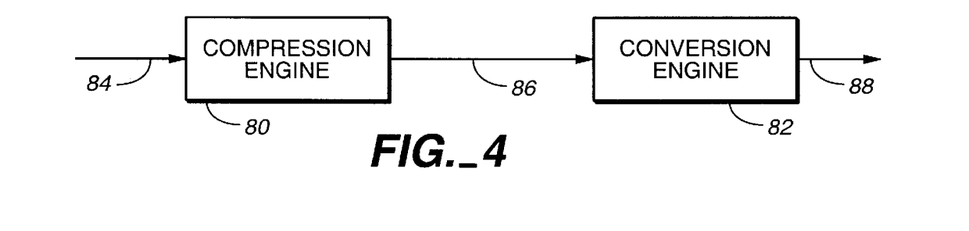
FIG. 4 is a more detailed block diagram of the source of FIG. 2.

FIG. 4 is an expanded block diagram of source 72 of FIG. 2. Source 72 includes a compression engine 80 and a conversion engine 82. Compression engine 80 receives a data stream 84 and produces compression codes and character values 86 that are passed to conversion engine 82. Conversion engine 82 converts the compression codes and character values into values that fall within a set of values that are valid for channel 76. In addition, conversion engine 82 generates a mask that has a value found in the set of valid values for the channel. The mask describes the location of the compression codes and character values in a compressed data stream 88 produced by conversion engine 82. The mask is discussed further below, with reference to FIG. 7. Compressed data stream 88 is then transmitted along channel 76.

Figure 5:
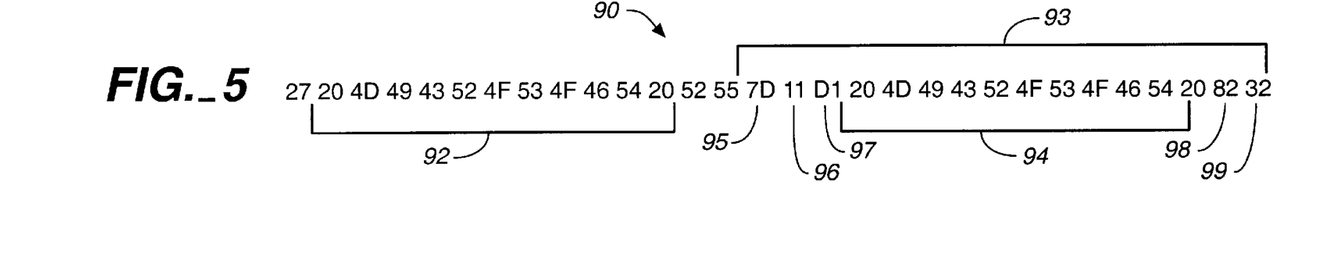
FIG. 5 is an example data stream received by the compression algorithm in FIG. 4.

FIG. 5 is a data stream 92 which is an example of a data stream 84 presented to compression engine 80. In FIG. 5, data entering compression engine 80 first is shown to the left, and data entering algorithm 80 last is shown to the right. The data displayed in FIG. 5 is in hexadecimal format.

Data stream 90 includes two identical sections, 92 and 94, that are identified by compression engine 80 as being eligible for compression. First section 92 is passed by compression engine 80 as characters, and second section 94 is replaced with compression codes. These compression codes indicate the location of the beginning of section 92 in the data stream and indicate the length of section 92. With this information, a decompression engine can move back through the data stream to the location of section 92, copy the entirety of section 92, and replace the compression codes with the copied section. The distance to the beginning of a section to be copied is known as the offset, and the length of the section to be copied is known as the length.

The length and offset can each be described using single bytes or may be described using a plurality of bytes.

Preferably, the length and offset are described using the smallest number of bytes possible in order to maximize the gains achieved by compression. In general, compression engines will not replace a section of bytes unless the section is longer than two bytes long.

Figure 6:
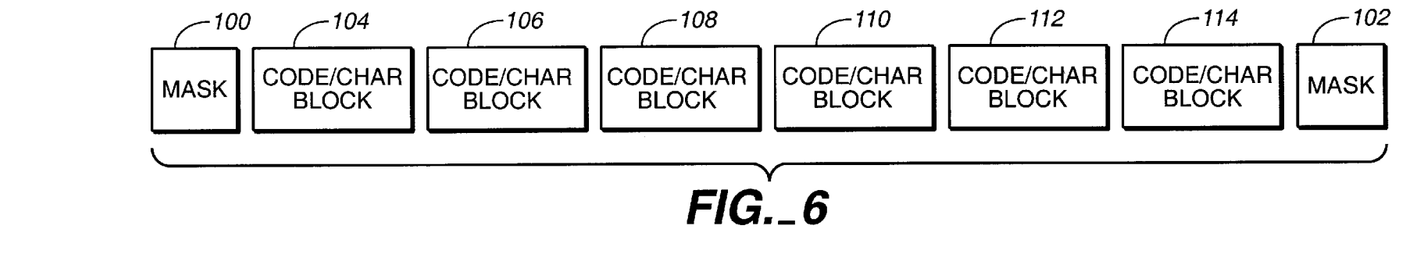
FIG. 6 is a data stream layout after compression for a preferred embodiment of the present invention.

FIG. 6 shows the general layout of compressed data 88 as it passes from conversion engine 82. Compressed data 88 includes a number of masks represented in FIG. 6 by masks 100 and 102. Each mask has a number of associated compression code/character blocks. For example, in FIG. 6, mask 100 is associated with compression code/character blocks 104, 106, 108, 100, 112, and 114. FIG. 6 shows a preferred embodiment of the invention where six compression code/character blocks are associated with each mask. Although not shown in FIG. 6, mask 102 is associated with six other compression code/character blocks. Each compression code/character block is constructed from one or more bytes of values. Each mask and each byte in the compression code/character blocks is found in a set of valid bytes for a particular restricted channel.

Figure 7:
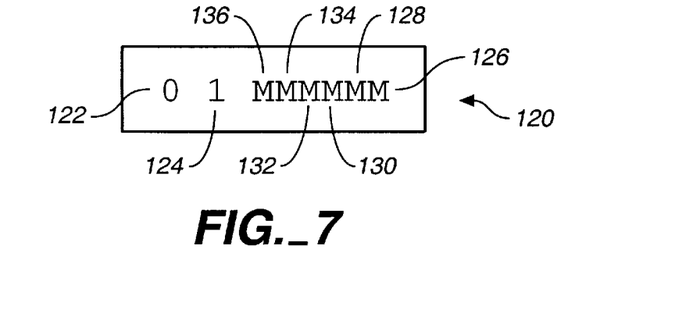
FIG. 7 is a preferred layout for a mask of the present invention.

FIG. 7 shows a preferred layout for a mask 120. Mask 120 meets the limitations of a channel restricted to passing printable characters having hexadecimal values between "20" and "7F". Mask 120 is limited to this range by its most significant bits 122 and 124, which are always 0 and 1, respectively. This forces mask 120 to have a value between "40" hexadecimal and "7F" hexadecimal.

The six least significant bits of mask 120 describe the location of compression code values and character values in the portion of the data stream following mask 120. In particular, least significant bit 126 indicates whether the next compression code/character block after mask 120 contains a compression code or a character value. If the next compression code/character block contains a compression code, bit 126 will have a value of "1". If the next block has a character value, bit 126 will have a value of "0". Bits 128, 130, 132, 134, and 136 of mask 120 respectively describe the contents of the second, third, fourth, fifth, and sixth blocks following mask 120.

Figure 8:
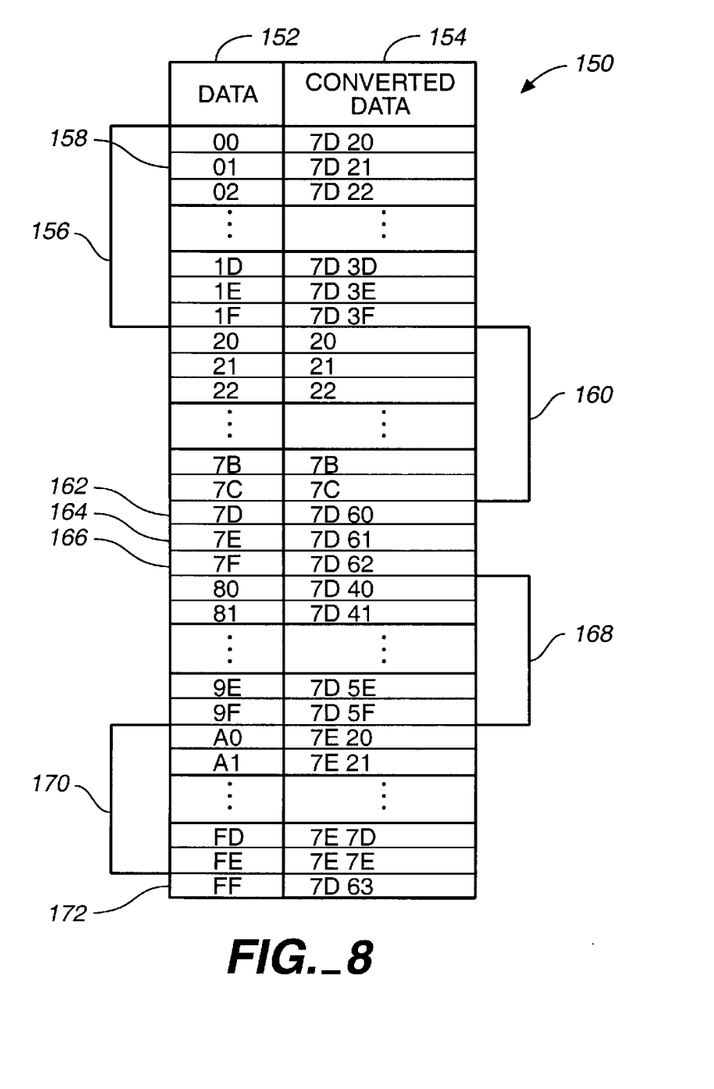
FIG. 8 is a table of character conversions under the present invention.

FIG. 8 is a table 150 showing the relationship between data 152, which is input to a conversion engine of the present invention as character values, and converted data 154, which is produced by the conversion engine. Table 150 does not describe the conversion of compression codes, only character values. The production of compression codes is discussed further below.

In table 150, character values belonging to a subset 156 have hexadecimal values between "00" and "1F" and are converted into two-byte blocks having hexadecimal values between "7D20" and "7D3F". To convert the character values of subset 156, "20" hexadecimal is added to the character value, and the sum is appended to "7D" hexadecimal. Thus, for character value 158, "20" hexadecimal is added to the data value of "01" hexadecimal, producing a sum of "21" hexadecimal. This sum is then appended to "7D" to form the converted data, which is equal to "7D21".

Character values belonging to a subset 160 have values between "20" and "7C" hexadecimal. Since these values are directly printable, they meet the requirements of a channel restricted to printable characters. In a preferred embodiment of the present invention, these characters are not manipulated by the conversion engine and are passed directly to the compressed data stream.

Entries 162, 164, and 166 have character values of "7D", "7E", and "7F", respectively. These character values are converted to values "7D60", "7D61", and "7D62", respectively.

Character values in subset 168 of table 150 have values between "80" and "9F" hexadecimal. These character values are converted to values having a range between "7D40" and "7D5F". The conversion is accomplished by subtracting "40" hexadecimal from the character value and appending the difference to "7D" hexadecimal. Thus, "9E" minus "40" hexadecimal results in "5E" hexadecimal, which is appended to "7D" hexadecimal to produce the converted value "7D5E" for character value "9E".

Character values of subset 170 range between hexadecimal "A0" and hexadecimal "FE". Values in subset 170 are converted by subtracting hexadecimal "80" from the values and appending the difference to "7E" hexadecimal. Thus, hexadecimal "A1" minus hexadecimal "80" creates a difference of "21" hexadecimal, which is appended to "7E" to form a converted data value of "7E21".

Entry 172 is for character value "FF", which is converted into converted data "7D63".

Note that for each character value that is converted by conversion engine 82 in FIG. 4, the one-byte character value becomes a two-byte converted data value. Only those character values that are already in form for the restricted channel remain one-byte values. Although "7D" and "7E" have been used as the additional bytes for the two-byte converted data values, those skilled in the art will recognize that other values that meet the channel restrictions could be used in their place.

Figure 9:
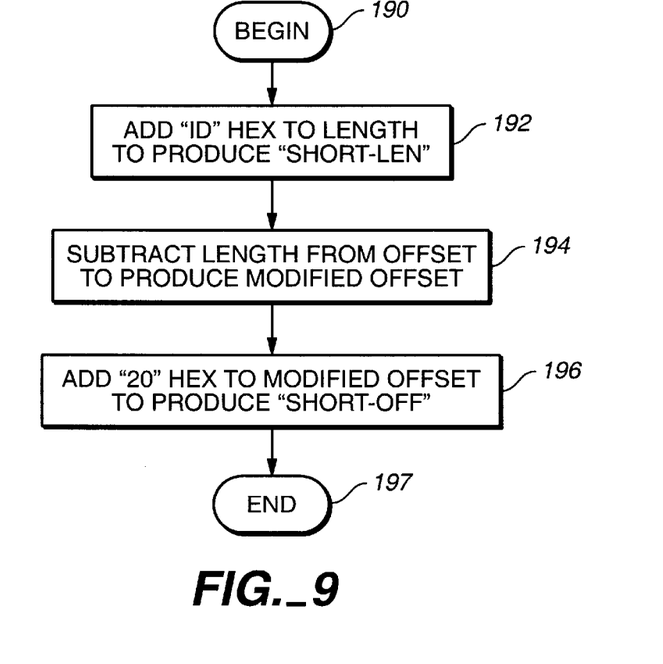
FIG. 9 is a flow diagram for the production of short-code lengths and offsets under the present invention.

FIG. 9 is a flow diagram of the production of a compression code known as a "short compression code." In many compression engines, there are two different types of compression codes. A short compression code is used to described repeating sections of data that are of a small length and are located a small distance in the data stream from the current location. Long compression codes describe repeating sections of data that have a large length or are located a long distance from the current location in the data stream. Both short and long compression codes consist of a length and an offset.

The offset and length produced by compression engine 80 of FIG. 4 does not necessarily meet the restrictions of the channel. FIG. 9 is a flow diagram for converting a short compression code's length and offset so that the converted values are in the range of values permitted for a restricted channel. In FIG. 9, the channel is restricted to printable characters having hexadecimal values between "20" and "7F".

From beginning state 190, the conversion engine proceeds to state 192, where "1D" hexadecimal is added to the length to produce "short-len", which is the short code length sent in the compression data. The addition of "1D" to the length forces short-len to have a value of at least "20" hexadecimal, since the minimum length produced by the compression engine is "3". In preferred embodiments, the maximum short code length is 34, resulting in a maximum value for short-len of "3F" hexadecimal. Thus, short-len will have a value between "20" and "3F" hexadecimal.

The conversion engine proceeds to state 194, where it subtracts the length provided by the compression engine from the offset provided by the compression engine to produce a modified offset. This subtraction increases the distance that can be represented by the offset value passed through the channel, since the destination will he able to add the length back into the offset.

The conversion continues at state 196, where "20" hexadecimal is added to the modified offset to produce "short-off", which is the short-code offset passed through the channel. The addition of "20" hexadecimal to the modified offset produces a minimum offset value of "20" hexadecimal. In preferred embodiments, the compression engine produces a maximum short-code offset equal to the length of the short code plus 94 bytes. Thus, in preferred embodiments, short-off can have a value between "20" hexadecimal and "7E" hexadecimal. Once short-off has been produced, the process ends at state 197.

Figure 10:
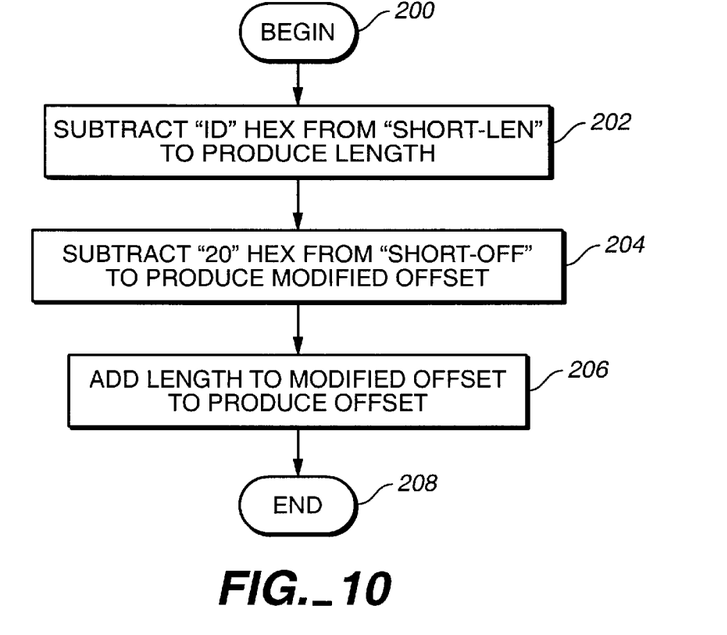
FIG. 10 is a flow diagram for the recovery of short-code lengths and offsets under the present invention.

FIG. 10 is a flow diagram of the recovery of a short-code length and short-code offset at a destination receiving data encoded through the process of FIG. 9. The process begins at state 200 and moves to state 202, where "1D" hexadecimal is subtracted from "short-len" to produce the length for the short code. In state 204, "20" hexadecimal is subtracted from short-off to produce a modified offset, which is added to the length in state 206 to produce the offset. The process is complete at state 208.

Figure 11:
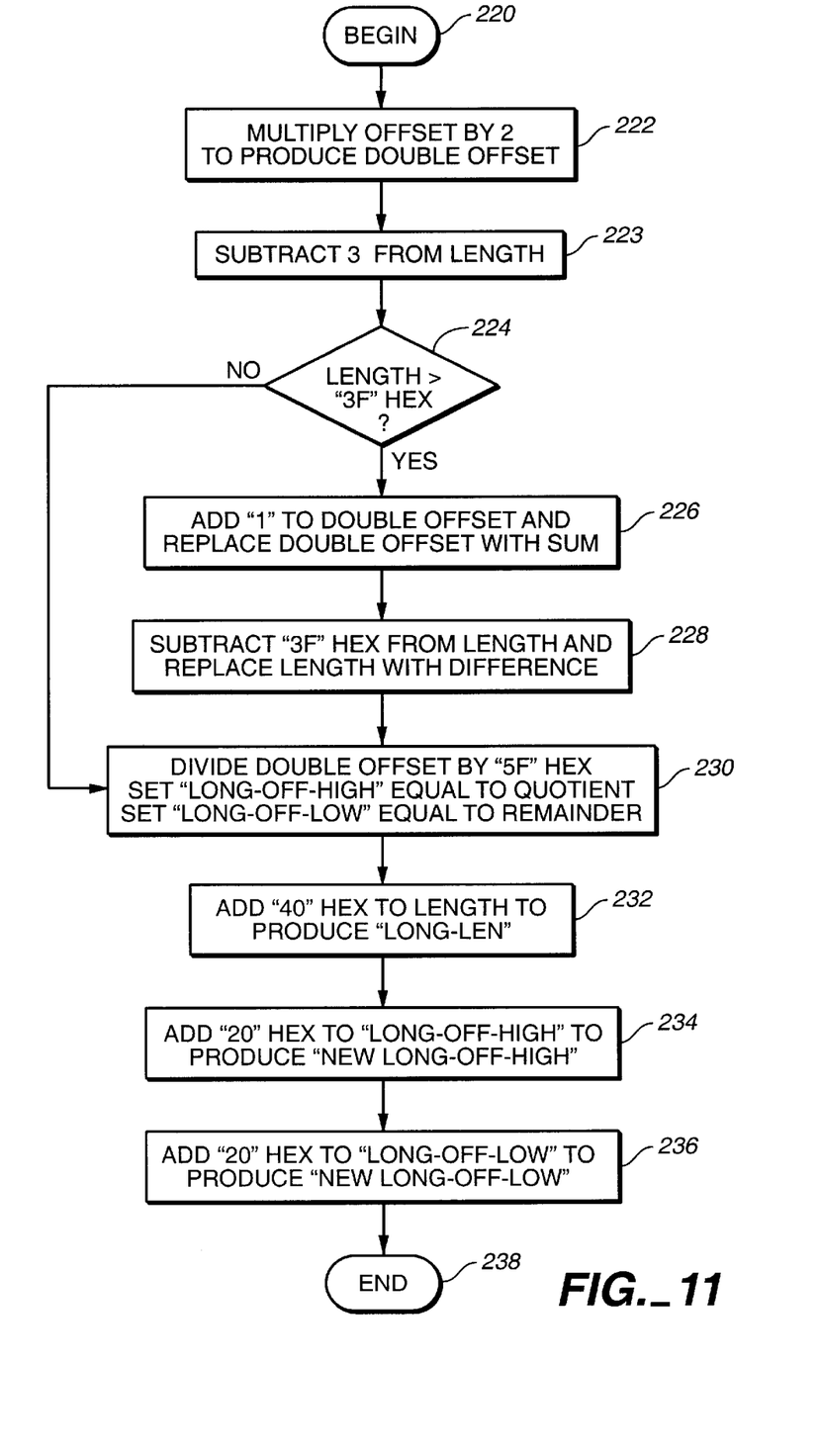
FIG. 11 is a flow diagram for the production of long-code lengths and offsets under the present invention.

FIG. 11 is a flow diagram for a preferred embodiment of a process used by conversion engine 82 of FIG. 4 to convert long compression codes into a format that meets the restrictions of a channel that only passes printable characters. The process of FIG. 11 begins at state 220 and moves to state 222, where the offset provided by the compression engine is multiplied by two to produce a double offset. This multiplication is performed to ensure that, in the binary representation of the double offset, the least significant bit is zero.

In state 223, "03" hexadecimal is subtracted from the length. Since in preferred embodiments, the compression engine produces long-code lengths between "3" and "128" decimal, this subtraction produces a new length within the range of "0" to "125" decimal.

Since there are only 95 values between "20" hexadecimal and "7E" hexadecimal, one byte cannot represent all 126 possible lengths provided by the compression engine. To avoid adding an extra byte, one embodiment of the present invention uses the least significant bit of the double offset created in state 222 to act as a marker bit to describe the length. Specifically, the least significant bit indicates whether the length is greater than "63" decimal or "3F" hexadecimal.

State 224 determines whether the marker bit should be set to indicate that the length is greater than "3F" hexadecimal by comparing the length provided by the compression engine to "3F" hexadecimal. If the length is greater than "3F" hexadecimal, the process continues at state 226, where a one is added to the double offset. The process then continues at state 228, where "3F" hexadecimal is subtracted from the length. In essence, steps 226 and 228 replace "3F" of the length with the marker bit.

If the length is not greater than "3F" hexadecimal at state 224, the least significant bit of the double offset remains at "0". In either case, the process continues at state 230 where two bytes are produced that represent the offset. These bytes are the long offset high byte, designated as long-off-high, and the long offset low byte, designated as long-off-low. To form these bytes, the double offset is divided by "5F" hexadecimal. The quotient is then assigned to long-off-high, and the remainder is assigned to long-off-low. The reason for the division by "5F" is described further below.

After state 230, the process continues at state 232, where "40" hexadecimal is added to the length to produce the value identified as long-len. In light of state 223, which subtracts "03" from every length, and state 228, which subtracts "3F" from lengths greater than "3F", the length has a value between 0 and "3F" at state 232. Thus, adding "40" hexadecimal to the length at state 232 creates a value between "40" hexadecimal and "7F" hexadecimal.

After long-len has been produced in state 232, the process continues at states 234 and 236, where "20" hexadecimal is added to long-off-high and long-off-low to produce new long-off-high and new long-off-low. Adding "20" hexadecimal to these two values ensures that new long-off-high and new long-off-low each have hexadecimal values between "20" and "7F". The upper limit of "7F" hexadecimal is set for new long-off-low in state 230, where the division by "5F" hexadecimal ensures that the remainder can be no larger than "5E" hexadecimal. Thus, adding "20" hexadecimal to the maximum long-off-low value of "5E" hexadecimal produces a maximum new long-off-low value of "7E".

The maximum value of "7E" hexadecimal for new long-off-high is determined by preferred limits on the compression engine such that the compression engine does not produce an offset greater than "119F" hexadecimal or "4511" decimal. After new long-off-high and new long-off-low have been produced, the process ends at state 238, where the long code is sent. At state 238 the long code consists of long-len, new long-off-high, and new long-off-low.

Note that the destination can distinguish a long code from a short code based on the value of the length transmitted through the channel. For long codes, the length will have a value between "40" hexadecimal and "7F" hexadecimal. For short codes, the length will have a value between "20" hexadecimal and "3F" hexadecimal.

Figure 12:
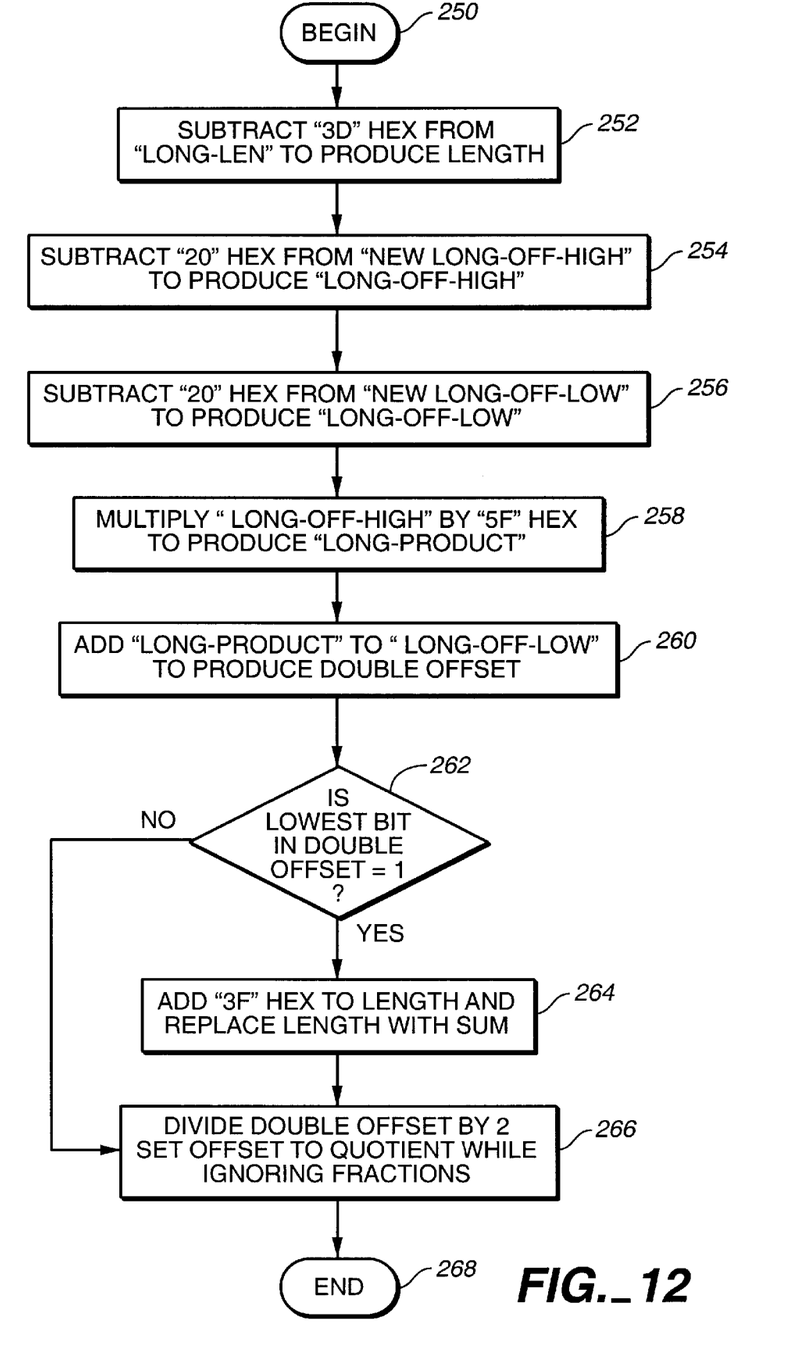
FIG. 12 is a flow diagram for the recovery of long-code lengths and offsets under the present invention.

FIG. 12 is a flow diagram for recovering long-code lengths and offsets from a channel having a printable character restriction requirement. Beginning at state 250, the process continues at state 252, where "3D" hexadecimal is subtracted from long-len to produce the length code.

The process continues at state 254, where "20" hexadecimal is subtracted from new long-off-high to produce long-off-high, the high offset byte for the long code. Similarly, at state 258, "20" hexadecimal is subtracted from new long-off-low to produce long-off-low, the low offset byte for the long code.

At state 258, long-off-high is multiplied by "5F" hexadecimal to produce long-product. At state 260, long-product is added to new long-off-low to produce double offset.

In state 262, the least significant bit of double offset is examined to determine if it is equal to one. If it is equal to one, it represents "3F" of the length which must be added back into the length. This occurs at state 264.

If the least significant bit in double offset is not equal to "1" at state 262, the process drops directly to state 266, which is the same state that follows state 264. In state 266, double offset is divided by "2" decimal. The integer portion of the quotient produced by the division becomes the long-code offset. The process ends at step 268.

Figure 13:
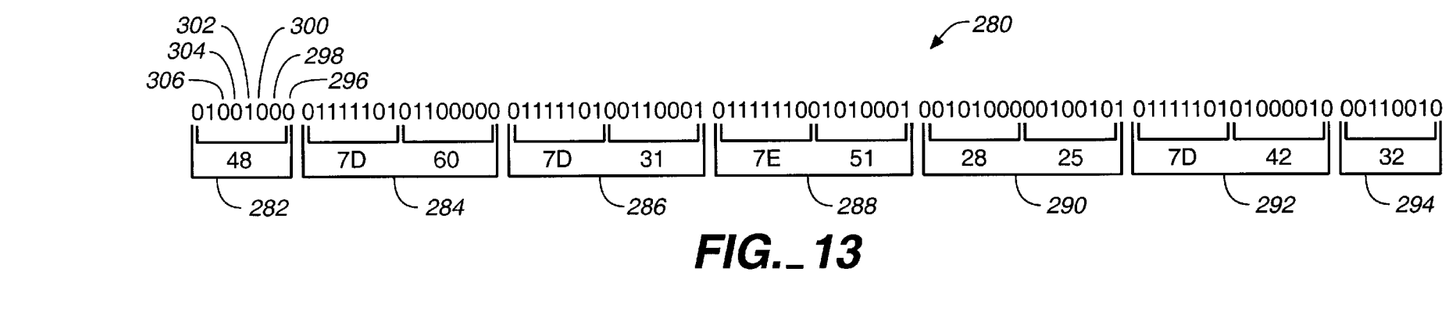
FIG. 13 is an example section of a compressed data stream based on the input data stream of FIG. 5.

FIG. 13 is a diagram of an example section 280 of compressed data stream 88, produced using the processes of FIGS. 9 and 11. Section 280 includes a mask 282 that describes the contents of six blocks, 284, 286, 288, 290, 292, and 294. To aid in understanding the invention, section 280 is the result produced by the compression and conversion of section 93 of FIG. 5. Section 280 is shown in two formats, binary and hexadecimal, with the hexadecimal values shown below their respective binary values.

The first value in section 93 of FIG. 5 is byte 95, which is a character value of "7D". Byte 295 is converted using table 150, where a data value of "7D" is converted into a value of "7D60". This converted value is placed in first block 284 and bit 296 of mask 282 is set to "0" to indicate that block 284 contains a character value.

The second byte in section 93 of FIG. 5 is character value 96, having a value of "11" hexadecimal. The conversion of byte 96 is performed using table 150, where "11" hexadecimal is within subset 156. Under the rules described above for converting values in subset 156, "11" is converted to "7D31", as shown in block 286 of FIG. 13. In addition, bit 298 of mask 282, which represents second block 286, has a value of 0 to indicate that block 286 represents a character value.

The third byte of section 93 of FIG. 5 is byte 97, which has a character value of "D1" hexadecimal. Byte 97 is converted using table 150 where "D1" hexadecimal falls within subset 170, resulting in a conversion to "7E51". This converted value is placed in block 288 of section 280 and a "0" is placed at bit 300 of mask 282 to indicate that block 288 is a character value.

After character value 97 of FIG. 5 is section 94, which is replaced by a short compression code by the compression engine. Section 94 is a duplicate of section 92, which begins 16 bytes before section 94 and has a length of 11 bytes. Thus, the short code length produced by the compression engine is 11, and the short code offset is 16. Using the process of FIG. 9, the length of 11, "0B" hexadecimal, is converted to "28" hexadecimal by the addition of "1D" hexadecimal. The offset of 16 decimal, "10" hexadecimal, is converted to "25" hexadecimal by subtracting "0B" hexadecimal, the original length, and by adding "20" hexadecimal. In block 290, the length appears as the first byte having a value of "28" hexadecimal and the offset appears as the second byte having a value of "25" hexadecimal. Bit 302 of mask 282 has a value of 1 to indicate that block 290 contains a code value.

In section 93 of FIG. 5, the next value after section 94 is character value 98, which has a value of "82" hexadecimal. This character value is converted using table 150, where the character value falls within subset 168, resulting in a converted value of "7D42" hexadecimal. This converted value appears in block 292, which has a corresponding bit 304 in mask 282. Bit 304 has a value of 0 to indicate that block 292 contains a character value.

The last value in section 93 of FIG. 5 is character value 99, which has a value of "32" hexadecimal. "32" hexadecimal falls within subset 160 of table 150 and is not converted since it is already a printable character within the range of "20" hexadecimal to "7E" hexadecimal. As such, block 294, which carries this character value, only has a single byte. Corresponding mask bit 306 of block 294 is a 0 indicating that block 294 contains a character value.

Although the present invention has been described in relation to a restricted channel having the requirement that all bytes fall within the range of "20" hexadecimal to "7E" hexadecimal, other channel restrictions may be applied to the present invention, resulting in changes in the division of values within table 150 and in the conversions performed on certain characters. Nonetheless, the core aspects of the present invention would remain the same with different channel restrictions. In particular, compressed values that meet the channel restriction would not be converted and would be passed directly to the channel. In addition, the mask would be configured so that it meets the channel restriction while directly conveying the location of code values and character values in the compressed data stream.

Although the present invention has been described with reference to preferred embodiments, workers skilled in the art will recognize that changes may be made in form and detail without departing from the spirit and scope of the invention.

What is claimed is:

1. A computer-readable medium having computer-executable instructions for a method of compressing data to form a compressed data stream for a restricted channel, the restricted channel capable of passing values taken from a set of valid values and not capable of passing values taken from a set of invalid values, the method comprising the steps of:
   compressing data to form code values and character values;
   creating at least one mask that indicates the location of code values and character values in the compressed data stream, each mask comprised of a valid value.

2. The computer-readable medium of claim 1 wherein the method further comprises converting code values into values from the set of valid values.

3. The computer-readable medium of claim 1 wherein the method further comprises converting character values from the set of invalid values into converted values from the set of valid values and inserting the converted values in the compressed data stream.

4. The computer-readable medium of claim 3 wherein character values from the set of valid values are inserted directly into the compressed data stream.

5. The computer-readable medium of claim 3 wherein a single character value from the set of invalid codewords is converted into a first value and a second value from the set of valid codewords, the first value from a sub-set of marking values from the set of valid codewords, the marking values indicative of the conversion.

6. The computer-readable medium of claim 5 wherein a character value that matches a marking value is converted into a first value and a second value from the set of valid codewords, the first value from the sub-set of marking values.

7. The computer-readable medium of claim 1 wherein the set of invalid values comprises bytes having hexadecimal values greater than 79 and bytes having hexadecimal values less than 20.

8. A computer-readable medium having stored thereon a data structure comprising:
   at least one code value representative of a type of compression performed on data, the code value comprising values that are members of a set of valid values for a channel limited to carrying only valid values;
   at least one character value representative of data and comprising values that are members of the set of valid values; and
   at least one mask indicating the location of code values and character values in the data structure, the mask being a member of the set of valid values.

9. The computer-readable medium of claim 8 wherein data represented by a character value is the same as the character value if the data is a member of the set of valid values.

10. The computer-readable medium of claim 8 wherein the data structure comprises a first character value and a second character value together representative of a single data value.

11. The computer-readable medium of claim 10 where in the first character value has a value that indicates that the first and second character values represent a single data value.

12. The computer-readable medium of claim 8 wherein at least one code value comprises two values that are members of the set of valid values.

13. The computer-readable medium of claim 8 wherein at least one code value comprises three values that are members of the set of valid values.

14. A method for converting compressed data into a data structure comprising values from a limited character set, the method comprising:

converting compression code values into converted compression code values found in the limited character set;

converting character values into converted character code values found in the limited character set;

organizing the converted compression code values and the converted character values in a data structure; and creating a mask having a value found in the limited character set, the mask indicating the location of converted compression code values and converted character values in the data structure.

15. The method of claim 14 wherein character values that match values found in the limited character set are placed directly in the data structure.

16. The method of claim 14 wherein a character value that is not found in the limited character set is converted into a first value and a second value, the first and second value both in the limited character set.

* * * * *